(12) United States Patent
Lee et al.

(10) Patent No.: US 7,837,770 B2
(45) Date of Patent: Nov. 23, 2010

(54) APPARATUS AND METHOD FOR COLLECTING RESIDUAL PRODUCTS FOR FPD AND SEMICONDUCTOR

(76) Inventors: Ang-Goo Lee, 4003-Halla Vivaldi Apt., Ueonmok-maeul, Jung-dong, Giheung-gu, Yongin-si, Gyeonggi-do (KR) 446-916; Kwang-Jin Park, 222-201, Daelim Apt., Gwongeon-dong, Suwon-si, Gyeonggi-do (KR) 441-888

( * ) Notice: Subject to any disclaimer, the term of this patent is extended or adjusted under 35 U.S.C. 154(b) by 1002 days.

(21) Appl. No.: 11/380,583

(22) Filed: Apr. 27, 2006

(65) Prior Publication Data

US 2006/0243137 A1    Nov. 2, 2006

(30) Foreign Application Priority Data

Apr. 29, 2005    (KR) .................. 10-2005-0036245

(51) Int. Cl.
*B01D 53/00*    (2006.01)
(52) U.S. Cl. .................. 95/290; 95/288; 95/291; 55/434.2; 55/434.3; 62/55.5; 438/759
(58) Field of Classification Search .................. 95/288, 95/290; 55/434.2, 434.3; 62/55.5; 438/759
See application file for complete search history.

(56) References Cited

U.S. PATENT DOCUMENTS

| 4,252,545 | A  | * | 2/1981 | Haferkorn ..................... 95/271 |
| 6,206,971 | B1 | * | 3/2001 | Umotoy et al. ............... 118/715 |
| 6,241,793 | B1 | * | 6/2001 | Lee et al. .................... 55/434.2 |
| 6,884,284 | B1 | * | 4/2005 | Jensen .......................... 96/281 |
| 2004/0069224 | A1 | * | 4/2004 | Lin et al. ..................... 118/715 |
| 2006/0169411 | A1 | * | 8/2006 | Han et al. ............... 156/345.29 |

* cited by examiner

*Primary Examiner*—Robert J Hill, Jr.
*Assistant Examiner*—Christopher P Jones
(74) *Attorney, Agent, or Firm*—Harry K. Ahn; Abelman Frayne & Schwab

(57) ABSTRACT

An apparatus for efficiently collecting reaction by-products in exhaust gases of a semiconductor processing or flat panel display processing device is provided. The collection apparatus includes a heating section connected to a process chamber of the semiconductor processing or flat panel display processing device. The heating section is designed to preheat the reaction by-products to prevent or reduce liquefaction of the reaction by-products. A by-product pile up section then rapidly cools the heated reaction by-products to convert the same into a solid form.

16 Claims, 3 Drawing Sheets

APPARATUS AND METHOD FOR COLLECTING RESIDUAL PRODUCTS FOR FPD AND SEMICONDUCTOR

BACKGROUND OF THE INVENTION

1. Field of the Invention

This invention is about an apparatus and method to pile up the by-products of semiconductors and flat panel display. It is also in regards to the detailed treatment of the substrate of the process chamber and vacuum installation; the use and application of the substrate treatment process. In any case, if the semiconductor is a substrate, it would use the production process and application as that of the installation of the semiconductor equipment; on the other hand, if the Flat Panel Display is a substrate, then it would undergo the production process and application as that of the process chamber and vacuum installation. In the production process of the Flat Panel Display and especially the element of semiconductor, it undergoes the CVD (Chemical Vapor Deposition) process and Dry Etch process; in this process, the chemical reactive gas reacts in the process chamber creating a thin film, forming by-products such as gas released through the vacuum pumps, which then effectively works in the pile up of the powder in the manufacturing process of the FPD (Flat Panel Display).

2. Description of the Related Art

First of all, the said invention has been applied for License No. 2005-6361 (Title: Pile up Process of By0products of Semiconductor Equipments) done to provide a detailed explanation of the process.

In the production process of semiconductors or Flat Panel Displays, the use of poisonous gas of the thin film deposition process especially or the Dry Etch process is mostly used. One of the processes in thin film deposition is the CVD process which occurs under high temperature, low pressure at many times processed in the plasma environment. Etch processing makes use of hydro etching which is similar to that of isotropic etching or many times uses an isotropic etching processed in the ionic state or plasma environment then processed to dry etching processes (S. M. Irving, Kodak Photoresist Sem. Proc., Vol. 2, May (1968)). CVD process is a process forming a thin film; a thin film insulation film is made through this process with a conductor within the device currently under the production process of VLSI (Very Large Scale Integration), it is also used widely as electrical insulator in between metal wiring and it is used to isolate the environment within the perimeter. In addition, a thin metal film made out of this process is also used in the electrical wiring of semiconductor devices. The most widely used insulation film matter are thin films made of silicon oxide film, silicon nitrate film, metal oxide film and high dielectric medium; for the metal substances there thin films such as poly-silicon film, metal silicide, aluminum or tungsten chromium and many more. There are many processes in formation of these thin films such as APCVD (Atmosphere Pressure CVD), LPCVD (Low-Pressure CVD), PECVD (Plasma-Enhanced CVD), MOCVD (Metal Organic CVD), ALD (Atomic Layer Deposition), TPD (Ticl based Pulsed Deposition) and many other processes.

The production process of semiconductors may use dry etching or the process of using of several toxic chemical gases. Within the reaction chambers, plasma etching generates volatile substances by chemical reactions with the assistance of the radicals in its plasmic state. Another plasma etching is the process of ion assist employing neutral radicals. The application number of US 2002/0168467 shows in general the structure progress of dry etching process. However, in this data, it does not fully clarify the handling of reaction of the remaining gases.

The manufacturing process of FPD (Flat Panel Display) is similar to that of the silicon semiconductor. Therefore, processes such as of thin film deposition, photolithograph, etching and many more constitutes the process; and to verify the results and condition of each of the processes, cleaning is also included to sustain the condition and cleanliness. To maintain the metal film and the transparency of the electrode, the sputtering method is used. As of the silicon and insulator films, PECVD (Plasma Enhanced Chemical Vapor Deposition) method is usually applied.

In the production process of semiconductors the wafer feature is removed or the wafer feature of the thin film is opted to be etched within the process chamber with the use of toxic gases such as Silane, Boron Chloride, and Hydrogen in high temperature. While the above process is in progress, various gases that are volatile, corrosive and other gases poisonous substances are released in large amounts into the exterior of the chamber.

The above-mentioned harmful gases released come in contact with the atmosphere, solidify and then transform to its powder form. This powder then adheres to the pumping line and increases the pressure of the ventilation or it may cause problems of contamination of the wafer due to the countercurrent of the exhaust gas within the process chamber.

To solve the above-mentioned problems as shown in the case of U.S. Pat. No. 6,528,420 (Wei Hua Tong et al.), incorporated herein by reference, a powder trap is fully equipped to condense the exhausted gas discharged from the aforementioned process chamber in between the vacuum pump and the process chamber.

However, such provision (powder trap) has caused problems so far. Namely, until the by-product produced in the exterior of the process chamber from the reaction is transformed into powder form which then accumulates in the trap, an ample amount of time is consumed. Thus the standby time until the by-product formed from the reaction in the process chamber will be eliminated will take longer, lowering the operation time of the equipment.

Moreover, with regards to the limited space in the trap, the accumulating powder will have to be eliminated and cleaned frequently; due to these factors, the standby time of the process chamber is then prolonged causing problems of lengthening of the total process time.

SUMMARY OF THE INVENTION

Therefore, the present invention has been invented to resolve all sorts of problems that arise. With the inclusion of the process chamber, reactive gas inflow passage and gas exhaust passage, moreover providing the section to efficiently pile up the by-products with the use of heating sections and coolants in between the gas exhaust and vacuum pumps; therefore in processing of the semiconductor device such that the production of the unreactive gas in the interior and toxic gases shall be effectively piled up, hence forming a stable semiconductor thin film deposition process and etching process; furthermore, making the thin film deposition stable and dry etching process of the Flat Panel Display equipment a priority. The application of the right amount of heat for the efficient pile up of the inflow of the reaction by-products in the process chamber to reduce the high liquefaction of the reaction by-products is the second objective. Third objective is to promote the pile up of the reaction by-products by the infusion of coolants in the lateral part of the interior. With these factors in mind, it is the fourth objective to elevate the quality and reliability by providing an apparatus and method to pile up the by-products of semiconductors and flat panel display during its installation.

Many factors are included to accomplish the above-mentioned objectives: the influx passage of the reactive gases within the process chamber of the invention and the exhaust passage to release the remaining gases of the reaction by-product after the production process of the semiconductors and Flat Panel Display; a heating section to reduce or lower the high liquefaction rate prior to the efficient pile up of the reaction by-products incoming from the process chamber by-product pile up section to pile up the reaction products with the use of low temperature cooling plates and at the same time connect the upper section to the heating section and the lower section vacuum pump simultaneously; to efficiently infuse the coolant from the exterior into the lower part of the pile up route in the pile up of reaction by-products as above; use of the lateral part of the pile up section to provide the cooling plate to supply at the same time discharge through the lateral sides; to provide the facility pile up of the by-product and to discharge the coolant of the semiconductor and Flat Panel Display from the upper section to the exterior.

DESCRIPTION OF SPECIFIC EMBODIMENTS

Figure 1:
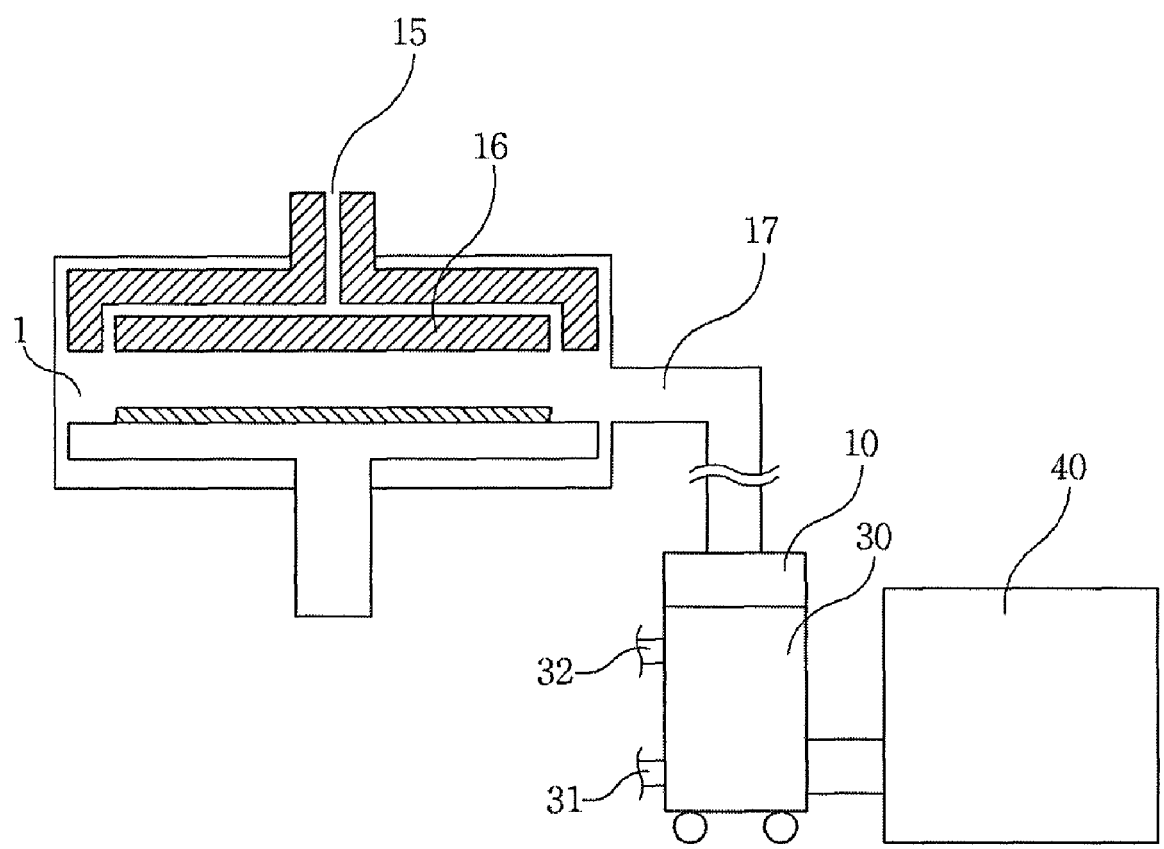
FIG. 1 is a brief drawing illustrating an apparatus for collecting residual products for FPD and semiconductor.

The composition applied for the pile up method in the semiconductor and Flat Panel Display equipment is shown in FIG. 1. The pile up of the by-products is particularly shown in FIGS. 2 and 3.

In the following description, a detailed description of known functions and configurations incorporated herein will be omitted when it may make the subject matter of the present invention rather unclear.

Terminologies used to explain the said invention may be changed according to their usage, intention and functions as defined and assigned by the producer.

First of all, FIG. 1 is a brief compositional diagram of the invention. In the upper portion of the process chamber (1) is equipped with tie reactive gas inflow passage (15) and also electrodes (16) equipped in the interior as well. In addition, the above-mentioned process chamber (1) is attached to the first side of the gas exhaust passage (17) and at the same time in the lateral section of the gas exhaust passage (17) the heating section (10) with the by-product pile up section (30) is equipped respectively. Moreover, a vacuum pump (40) is connected to the other portion of the aforementioned by-product pile up section (30).

To further explain in detail the technical composition of the original invention, it is as follows.

The invention is connected to the above-mentioned process chamber (1) and heat is applied to the heating subsection (11) wherein the heating section (10) is equipped to reduce the liquefaction of the reaction by-products prior to the efficient pile up of the incoming reaction by-products in the above-mentioned process chamber. At this point, a distinct feature would be that the temperature of the above-mentioned heating section (10) will have a variability of 50 to 650 degrees (hereinafter, all degrees are in Centigrade/Celsius unless otherwise noted); in addition, the temperature of 50 degrees and below may be ineffective for heating, hence the temperature of 50 degrees and above is suitable. However, if the heating temperature goes above 650 degrees, it may also result in the high liquefaction of the reaction by-products, therefore a temperature of 650 degrees and below would suitable.

The first section of the by-product pile up section (30) is connected to the above-mentioned heating section (10), and simultaneously the other section is connected to the vacuum pump (40) and to pile up the reaction by-products in the interior, it is then equipped with a condensed water plate (50) (50a-c). To conjointly connect the pipes, a connector (41) is equipped in between the vacuum pump (40) and the body (31).

The lower portion of the by-product pile up section (30) is equipped with the main entryway of the coolant, and the upper portion is equipped with the exhaust passage for the coolant. The body (31) of the by-product pile up section (30) is in the interior. To hasten the pile up of the reaction by-products, the coolant is infused from the sides. Moreover, a passage is also provided for the supply and exhaust on the side. The lower section of the above-mentioned body (31) is also equipped with a castor (37) for condensed water to facilitate its transfer. When the lateral section is being mentioned, it would refer to the portion which is approximately perpendicular to the passage wherein the reaction by-products is infused into the by-products pile up section. As a whole, it puts the flow of the by-products as its basis.

Furthermore, in between the heating section (10) and by-product pile up section (30), the invention is equipped with a clamp (20) to accurately to separate or combine the heating section (10) and by-product pile-up section (30). In addition, since the technical composition of the above-mentioned clamp (20) is of common configuration, it will thus be omitted.

To further explain in detail the technical composition of the application of the by-product pile up section, it is as follows.

In the center of the body (31) of the aforementioned condensed water plate (50) (50a-c), a construction hole (55) is formed to attach the shaft (33), protruding in the center of the surface. A coolant section (53) connected to a supply belt (51) and exhaust belt (52) in the interior, at the same time, in the proper position it is equipped with an opening (54) (54a) (54b) (54c). A distinct formation of the above-mentioned supply belt (51) and the supply subsection (35), the exhaust belt (52) and the exhaust subsection (36) is set up in correspondence with reciprocality.

Another distinct feature is that the aforementioned odd-numbered plate (50) (50b) of the supply belt/port (51) (51a) and exhaust belt/port (52) (52a) is connected and installed in the same direction from the first portion of the supply subsection (35) and exhaust subsection (36). In addition, the above-mentioned even-numbered plate (50a) (50c) of the supply belt (52a) and the exhaust belt (51a) is connected and installed in the other section in the same direction.

At this juncture, around the perimeter of the above-mentioned shaft (33) protrudes a four key (33a) formation. This assures the condensed water plate (50) (50a) (50b) (50c) to be kept in good condition.

Another distinct feature is that an inflow of coolants, refrigerants or Freon gas may be used in the coolant section (53). (Diagram=as shown in plan)

Figure 2:
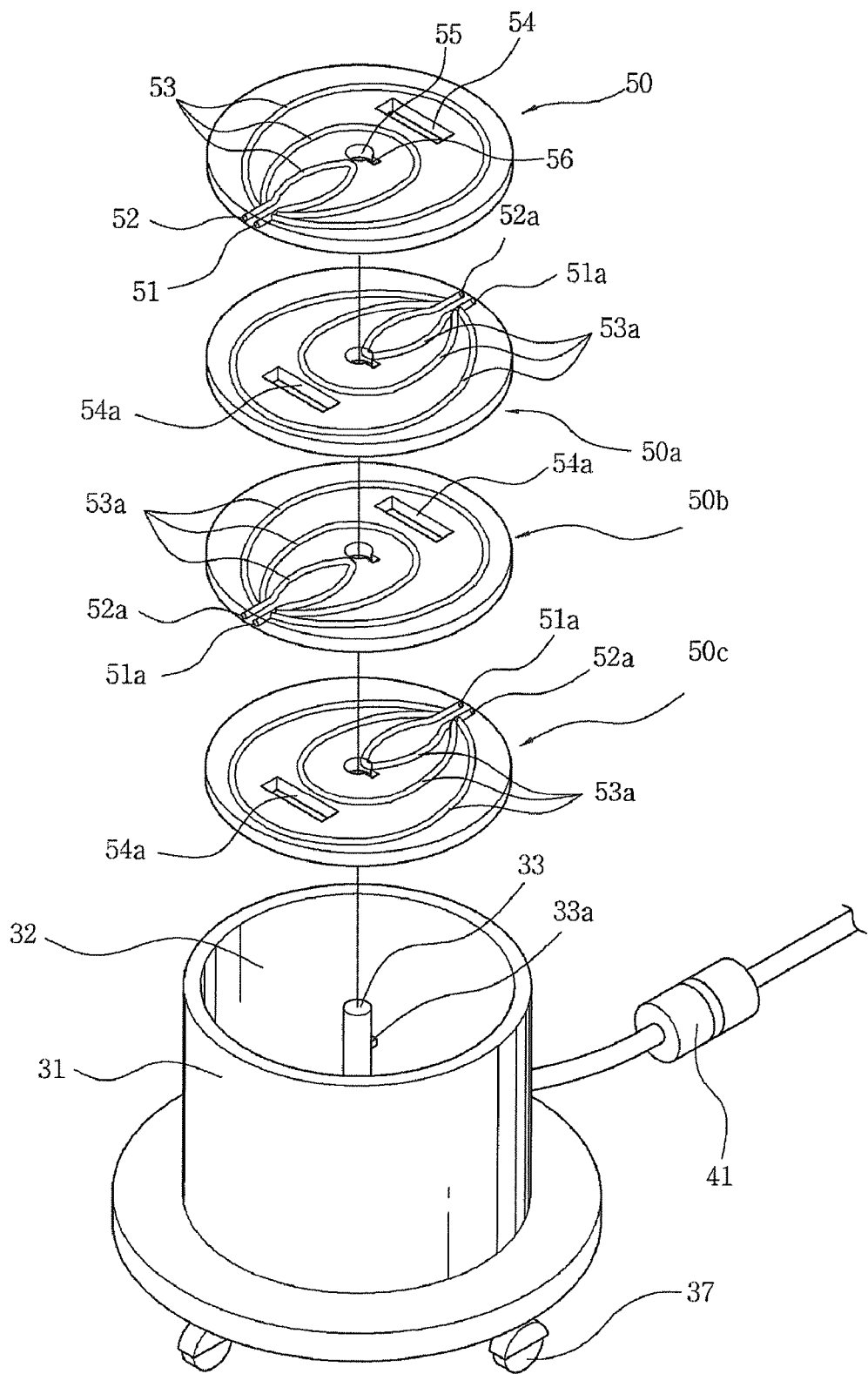
FIG. 2 is a perspective drawing of the main part of the breakdown of an apparatus for collecting residual products for FPD and semiconductor.
Figure 3:
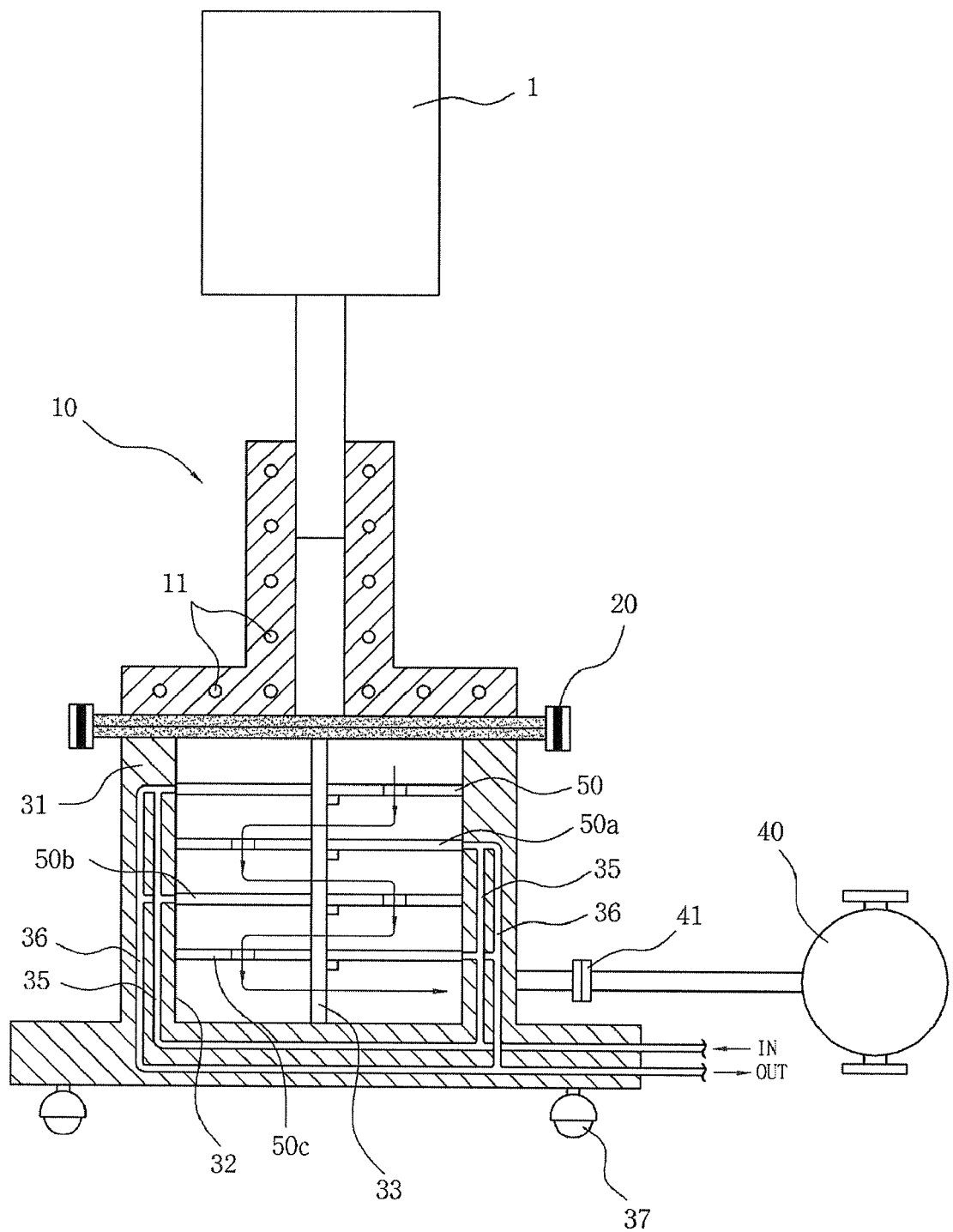
FIG. 3 is a front-view drawing of the main part of the breakdown of an apparatus for collecting residual products for FPD and semiconductor.

The set up of the invention is as shown in FIG. 2. With the construction opening (55) formed in the center of the condensed water plate (50) (50a) (50b) (50c), it is installed around the perimeter of the shaft (33). At this juncture, the key (33a) is sent through the key groove (56) and is rotated at a fixed distance; majority of the plate will be placed safely in good condition in the interior open section (32) of the body (31).

Also at this point, the supply belt (51) (51a) is formed on the even-numbered plate (50) (50b) as above and the exhaust belt (52) (52a) formed in the first portion of the supply section (35) and the exhaust section (36) which will be installed in accord to concurrence. The even-numbered plates (50a) (50c) is formed in the supply belt (51a) and exhaust belt (52) (52a) formed on the other side is installed on the supply section and exhaust section which is done in accord to conjunction.

The heating section (10) is conjoined in the upper portion of the by-product pile up section (30) with the use of the clamp (20).

Subsequently, in the semiconductor installation is the operator of the pile up equipment; the deposition of the thin film within the process chamber (1) or the pile up of reaction by-products generated during etching may be converted into powder form over a shorter period of time; hence maximizing the efficiency of the pile up.

The heating section (10) installed in the heating subsection (11) reduces the high liquefaction of the reaction by-products. At this point, the temperature of the heating section (10) as mentioned above has to be heated in a minimum temperature of 50 degrees to a maximum of 650 degrees.

Henceforth, the reaction by-products that permeate out from the heating section (10) pile up in the by-product pile up section (30). To hasten the pile up process of the reaction by-products, coolant, refrigerant or Freon gas is infused into the interior of the body (31) and the condensed water plate (50) (50a) (50b) (50c). Heating of the reaction by-products in the high temperature of 50 degrees and above, the reaction by-product which proceeds to the by-product pile up section is then exposed to a sudden change of temperature (low) which then hastens the high liquefaction process of the gas.

To explain further details, the inflow of the coolant into the individual plates in the supply section (35) that passes through the supply belt (51) (51a), after which the coolant that passed through the coolant section (53) is then discharged through the exhaust belt (52) (52a) and the exhaust section (36).

As the coolant is supplied through the plates as above, the reaction by-products then passes through each opening (54) in the direction of the arrow adhering and piling up in its powdery state on the surface of the plates.

The reaction by-products in its powder form, which accumulates in each plate, has been arranged to be cleaned easily. Once the clamp (20) is loosened, the reaction by-product section (30) and heating section 910) can be separated, separating each of the plates, allowing them to be cleaned. After cleaning, it can be reinstalled and reused.

On the other hand, in the installation stage of the produced semiconductor and Flat Panel Display of the by-product pile up method, the semiconductor substrate or the Flat Panel Display substrate is positioned in the interior of the process chamber; the inflow stage of the reactive gas from the influx passage into the process chamber; the stage wherein the remaining reaction by-products are discharged after the production process of the process chamber or the Flat Panel Display; the stage wherein prior to efficient pile up of the incoming reaction by-products, heat is applied to lower high liquefaction; the first section connected to the heating section is at the same time connected to the lower section of the vacuum pump, the by-product pile up stage wherein reaction by-products are piled up with the use of a low temperature plate located in the interior; next, to hasten the pile up of the reaction by-products, the infusion stage follows: the step wherein the coolant is infused from the lower section of the by-product pile up section into the interior of the pile up section; stage wherein the coolant is supplied and eliminated from the side of the piling section into the cooling plate; the discharge of the coolant from the by-product pile up section from the upper portion; all these are explained in further details below.

FIG. 1 is the working example of the approximate composition shown during the deposition of the silicon oxide film in the PECVD (Plasma Enhanced CVD) of the plasma environment in the production and installation of the semiconductor.

The deposition of the silicon oxide film process is formed in the process chamber. Inflow of Silane ($SiH_4$) and Nitrous Oxide ($N_2O$) gas, both reactive gases pass through the passage that connects to the shower head, which works as the upper section of the electrode. In the interior of the process chamber, the lower portion of the electrode is present, supporting the semiconductor substrate.

The chemical reaction that occurs within the process chamber can be expressed in the chemical equation (1):

$$SiH_4 + N_2O \rightarrow SiO_2 + N_2 + H_2 \tag{1}$$

The thin film $SiO_2$ can be formed by the mixture of the following compound gases, $SiH_4/N_2O$. Here $N_2O$ gas is used instead of $O_2$ because the energy used to mix N—N is greater than the compound N—O. This may be due to the fact that the breakdown of the reactive nitrogen slows down the rate of the formation of dust founded on the formation of nucleus in its gaseous state. The mixture of $SiH_4/N_2O$ causes the characteristic of the thin film to refract; thus the greater the amount of N and Si, the greater the amount of refraction. Overall, the PECVD $SiO_2$ thin film contains condensed stress. However, if the power of the frequency being input is altered, then the condensed stress may be converted to tensile stress. In the formation process of the thin film is to be explained in detail, Silane ($SiH_4$) gas and Nitrous Oxide ($N_2O$) gas is flowed in from the influx passage (15) into the process chamber (1), electrical energy is increased in the electrodes (16) to form plasma. The plasma above forms the ions and radicals of Silane ($SiH_4$) gas and Nitrous Oxide ($N_2O$). The radicals are then absorbed by the semiconductor substrate, which forms a new film through a chemical and physical reaction of atomic redistribution. The semiconductor substrate ground connection is placed on electrodes, which causes ions to collide lowering the sputtering effect. However, the whole quantity of the gas reacts not being able to form a thin film resulting in remaining reaction by-products. The reaction by-product from the process chamber passes through the gas exhaust passage (17) and is discharged through the vacuum pump. The by-products Silane ($SiH_4$) gas, Nitrous Oxide ($N_2O$), Nitrogen ($N_2$), Hydrogen ($H_2$), water ($H_2O$), etc. is included, passing through the heating section (10) in between the process chamber and vacuum pump. The heating temperature is from 50 to 650 degrees Centigrade. And since the effect would not be as effective if the heating temperature goes below 50 degrees centigrade neither will it be effective if the heating temperature goes above 650 degrees. Due to high temperature, effective high liquefaction will not occur within the by-product pile up section. High liquefaction in the heating section is lowered after which the reaction by-products will pass through the by-product pile up section (30). Since the temperature is kept low in the by-product pile up section by the coolant, once the temperature is heightened due to the coolant the reaction by-products take the form of the powder and adheres to the cooling plate. The coolant or refrigerant is supplied from the side of the body of the by-product pile up section to cool the cooling plate. The lessening of unnecessary supply sections within the interior of the by-product pile up section aside from the cooling plate serves as an advantage. Supplying the coolant from the lower section of the by-product pile up section and eliminating through the upper section, the liquefaction of the entire cooling plate evenly in the interior of the by-product is possible. Several layers of cooling plate is built up in the interior of the by-product pile up section to effectively pile up the powder, thus lessening the remaining gas that progresses toward the vacuum pump.

Aside from using Silane (SiH4) as the base gas, the deposition process of the Silicon oxide makes use of TEOS as the base gas in equation (2) and equation (3).

$$Si(C_2H_5O)+5O_3 \rightarrow SiO_2+H_2O+8CO_2+9H_2 \quad (2)$$

$$Si(C_2H_5O)_4 \rightarrow SiO_2+2H_2O+4C_2H_4 \quad (3)$$

In equation (2), TEOS ($Si(C_2H_5O)_4$) and Ozone ($O_3$) are used as reactive gases to obtain silicon oxide ($SiO_2$) and reaction by-product water ($H_2O$) and carbon dioxide($CO_2$). However, there are instance wherein the TEOS gas cannot be decomposed, at which point the reaction by-product TEOS ($Si(C_2H_5O)_4$) is included, causing its toxicity. This kind of toxic gas following the steps will then pile up in the by-product pile up section in powder form.

The chemical formula, as shown in equation (4) below, shows the formation of Silicon Nitride ($Si_3N_4$) with the use of PECVD method.

$$3SiH_4+4NH_3 \rightarrow Si_3N_4+12H_2 \quad (4)$$

Silane ($3SiH_4$) reacts with Ammonia ($4NH_3$) gas forming Silicon Nitride ($Si_3N_4$) and Hydrogen ($H_2$). The above equation (4) when applied by adding Nitrous Oxide ($N_2O$), Silicon Oxinitride ($SiOxNy$) can be obtained as seen in chemical equation (5).

$$SiH_4+NH3+N_2O \rightarrow SiOxNy+N_2+H_2 \quad (5)$$

Both equation (4) and (5) shows that not the whole Silane ($SiH_4$) gas and Ammonia gas reacts, releasing the remaining gases; this gas, in addition to nitrogen and hydrogen, is released through the vacuum pump passes through the heating section and then passes through the by-product pile up section. The by-product pile up section heats over high temperature lowering high liquefaction which is then piled up in the cooling plate in the interior of the by-product pile up section due to the sudden change of temperature. Moreover, the remaining gas is then lessened due to the flow through the vacuum pump, increasing the operation period.

A similar chemical equation may be obtained not only with the PECVD process but with the LPCVD process as well. Forming silicon oxide or poly-silicon film LPCVD or ALD (Atomic Layer Deposition) process is used. Moreover, the ALD, which is currently the process most frequently used in thin film deposition process, makes use of metal oxides such as Alumina (Al2O3) and Hafnium Oxide(HfO); high fuel substance such as PZT (Ferroelectric lead zirconate titanate/Pb(ZrTi)O) and BST ((BaSr)TiO3); substances used in forming metal films such as Metal Silicide Film, GST (GeSbTe), Aluminum or Tungsten and Chromium.

When LPCVD process is preferred over the PECVD process, then Doped Oxide, Tungsten (W), Tungsten Silicide (WSi2), Titanium (Ti) and Titanium Nitride (TiN) or such metal film depositions are used.

The deposition process of Doped Oxide is show in equation (6) below.

$$SiH_4+5O_2+2PH_3+B_2H_6 \rightarrow SiO_2+P_2O_5+B_2O_3+H_2 \quad (6)$$

The deposition process of Tungsten Silicide is shown in the equation (7) below.

$$2WF_6+5SiH_4 \rightarrow 2WSi_2+3SiF_4+10H_2 \quad (7)$$

The deposition process of Tungsten film is shown in the equation (8) below.

$$2WF_6+5SiH_4 \rightarrow 2WSi_2+3SiF_4+10H_2 \quad (8)$$

Equation (6), (7), and (8) makes use of toxic gases as shown above. Aside from these, CVD method is used to form Titanium (Ti) or Titanium Nitride (TiN) using gases such as TiCl4. Even though reaction takes place in a low pressure, plasma environment, the toxic gas above becomes reaction by-product and remaining gases and is discharged into the process chamber then into the vacuum pump. However, even before the vacuum pump is reached, the heating section is passed. In this area, high heat is applied prior to reaching the reaction by-product pile up section. The reaction by-products and the remaining gases undergo rapid cooling in the interior of the reaction by-product pile up section. After which the pile up of the powder takes place within the cooling plate. Most of the gas turns into powder state lessening the gas that travels into the vacuum pump. The major feature in the technical composition of the invention is that in between the process chamber and the vacuum pump, reaction by-products undergo the lowering of liquefaction in the heating section and the by-product pile up section is equipped to pile up the reaction by-products, thus to efficiently pile up the reaction by-products formed such that non-reactive gases and toxic gases in the production of the semiconductor element within the interior of the process chamber.

To explain in further detail, the aforementioned silicon oxide, silicon nitride or metal films is formed in the reaction with the incoming gas within the process chamber, after which the remaining gases and reaction by-products are discharged through the gas exhaust passage. The discharged reaction by-products then pass through the heating section due to the force of the vacuum pump progressing towards the by-product pile up section.

The first portion of the by-product pile up section is connected to the heating section at the same time the lower portion is connected to the vacuum pump. To pile up the reaction by-products in the interior, condensed water cooling plate is equipped. In this juncture, a castor connecting the pipes in between the body of the vacuum pump and the by-product pile up section is equipped.

It is then installed within the interior body of the by-product pile up section. The supply subsection and exhaust subsection is equipped for the inflow and exhaust of the coolant, which is done to hasten the pile up of the reaction by-products. For more convenience in transfer, majority of the castor is equipped in the lower portion of the body.

In addition, the invention is equipped with a clamp to combine or separate the heating section and by-product pile up section. A detailed technical explanation of the above-mentioned clamp due to its common features will be omitted.

The incoming reaction by-products in the process chamber applied into the by-product pile up section meet with the condensed water cooling plate in the interior of the by-product pile up section. Several cooling plates in the interior of the by-product pile up section constitutes a connecting hole protruding out from the shaft in the central surface of the body. The connecting cooling section is equipped to the supply belt and exhaust belt, which supplies and discharges the coolant or refrigerant, in the interior; at the same time, an opening in the proper position is formed. The supply belt to the supply section, exhaust belt to the exhaust section is connected and equipped in such sequence is another distinct feature.

Moreover, the supply belt and the exhaust belt of the odd-numbered cooling plate is connected and installed in the same direction as the supply section and exhaust section. As of the supply belt and exhaust belt of the even-numbered cooling plates, it is also connected into the supply section and exhaust section in the same direction. Around the perimeter of the shaft, consists of several protruding keys, so that the cooling plate is placed in good condition. Furthermore, another characteristic is that the aforementioned cooling plate consists of an opening, positioned either horizontally, vertically, inclined or any of the above, without the intervention of the coolant section.

Therefore the remaining gases and reaction by-product, which transfers from the vacuum pump from the opening in the condensed water cooling plate, turns into powder form and then piles up in the cooling plate. In addition, coolant, refrigerant or Freon gas may be used in the inflow into the coolant section above.

During the deposition of thin film in the production process of the Array of Flat Panel Display (FPD) installation, the sputtering method is used in the case of metal films and transparent electrodes; insulation films such as silicon, silicon oxide and silicon nitride is used in the PECVD method.

Sputtering, with the infusion of the Argon (Ar) gas in between the target and anode electrodes of the accumulating metals of high electric pressure with the use of plasma electrical discharge is into Ar+ ion, the high energy movement of Ar+ accelerated by the high electric pressure for the cohesion of the metal atoms are greater, then the atoms in the surface of the metals can be detached. The atoms, which underwent sputtering, consumes all the energy due to collision and intervention, hence will combine and form a thin film in the surface of the glass substrate. The deposition of the metal film using magnetron sputtering uses the DC (direct current) plasma primarily. As of the magnetic field, released by the structure of the diode in the circumference and back portion of source target with installed magnetic flux, isolates the secondary electron which intervenes in the spotting the Ar. Furthermore, the deposition rate of the plasma adjustment can be increased. During the deposition of Reactive Sputtering, the reactive gas is infused from the Target to the atoms, undergoing sputtering within the interior of the process chamber and infused gases will react by layer hence accumulating the compound or oxide film.

In the glass that shall be used in the physical and chemical reaction of forming FPD, the pattern formed by the PR(Photoresist) remains in the formed thin film portion, while the thin film without the PR is removed. In the etching process, dry etching which makes use of gas plasma, hydro etching which makes use of chemical solutions, after etching, the PR Strip process occurs due to the exposure of solvent.

Semiconductor etching process is similar to the aforementioned FPD etching process. Reactive gases used in etching any thin films may vary, while the use of PR as mask in the semiconductor substrate forming the fixed thin film pattern.

To explain the etching process of the Silane Oxide ($SiO_2$), the semiconductor substrate that has to be etched is positioned in the lower portion of the electrode within the interior of the process chamber. Reactive gases such as CF4 or gases in the Fluorine series and carrier gases are flowed in into the gas influx passage. With the use of plasma or reactive ion energy, the reaction within the process chamber is shown in the equation (9) below.

$$CF_4 + SiO_2 \rightarrow 2F + CF_2 + SiO_{2 \rightarrow SiF_4} + CO + O \quad (9)$$

The in flowing $CF_4$ gas is segregated into Fluorine ion and radical, $CF_2$ ion and radical within the plasma environment, it then reacts with the silicon oxides forming the $SiF_4$, a volatile reactants, and is then removed. Thus the silicon oxide portion not protected by the PR is deliberately etched out. Aside from the above reaction, other reactive gases such as Ar, $O_2$, $H_2$, $CHF_3$ or $C_2F_6$ are additional options to choose the PR or silicon film in etching.

In the dry etching process of the silicon film, the use of reactive gases such as HBr, $C_{12}$, $CC_1F_3$, $CC_{14}$ or $SF_6$ forms $SiC_{14}$, which is a volatile gas. Etching of silicon nitride makes of reactive gases such as $SF_6$, $CF_4$ or $CHF_3$, the nitrous film reacts with the volatile gases $SiF_4$, $NF_3$, CO, and C, after which these volatile gases are discharged. To etch aluminum metal film, $C_{12}$, $BC_{13}$, $SiC_{14}$, HBr and such gases are used to form and eliminate volatile gases such as $A_{12}C_{16}$. To prevent corrosion, gases such as $CHF_6$, $CF_4$, $N_2$ and the like may be used. Etching and elimination of Tungsten or Tungsten Silicide film is done by the use of such gases as $SF_6$, $C_2F_6$, or $C_{12}$ gas.

The semiconductor dry etching installation may also be the general explanation of the composition of the semiconductor construction progress equipment of FIG. 1. The processing chamber of the dry etching process is the process chamber (1). The etching of the reactive gas inflowing from the reactive gas influx passage (15), the incoming mixture of the reactive gases from the chlorine series or fluorine series will be dependent on the reactive gas to be etched. Once the dry etching is accomplished, the reaction by-products such as volatile gases and other reactive gases will be discharged through the gas exhaust passage (17). As the reactive by-products and remaining gases pass through the heating section lowering high liquefaction, they will turn to powder form; hence will pile up in the interior of the condensed water cooling plate within the by-product pile up section (30). Coolants or refrigerants, supplied into the cooling plate from the body of the by-product pile up section, maintains the temperature of the plates in its low state. Reducing the transfer of the remaining gases to a minimum, it maximizes the operation time of the semiconductor installation.

Among the FPD production process, metal or thin film deposition process or dry etching process is present. Reactive gas is flowed in from the plasma environment into the process chamber forming a fixed pattern, etching the portion of the thin film that needs to be eliminated. Portion of the reactive gas and reactive by-product is pushed through the vacuum pump with pressure through the heating section, by-product pile up section, and is discharged through the vacuum pump.

The aforementioned reaction by-products from the process chamber passes through the heating section (17), proceeds to the vacuum pump (40) and is then discharged. As the by-products pass through the heating section (10) in between the process chamber and vacuum pump, the temperature of the heating section should be from 50 to 650 degrees centigrade to reach the appropriate condition to be used. As the reaction by-products pass through the by-product pile up section (30) after the high liquefaction is lowered. The coolant, which is supplied from the lower portion of the outer surface of the by-product pile up section, is supplied into the side of the cooling plates maintaining a rather low temperature; hence when the reaction by-products with its high temperature converts into powder form due to the sudden change, adhering to the cooling plate. Since the coolant or refrigerant is supplied through the lateral portion of the by-product pile up section to cool the cooling plate; it is an advantage that no other equipment has to be installed aside from the cooling plate in the interior of the by-product section lessening the supply section. In the interior of the aforementioned by-product pile up section, several layers of cooling plates are formed, lessening the progression of the remaining gas and reactive by-products into the vacuum pump thus the pile up of the powder effectively.

With the aforementioned detailed inspection, a process chamber, reactive gas influx passage and gas exhaust passage is included in the invention. Equipping the heating section and the by-product pile up section in between the gas exhaust section and vacuum pump; heat is applied to reduce the high liquefaction to effectively pile up of the reaction by-products such as unreactive gases and toxic gases, formed during the production of the interior of the process chamber; thereafter, the stabilized semiconductor, Flat panel display under goes thin film deposition process and etching process. The effective pile up of the reaction by-products that flow into the process chamber is done by applying heat prior to its lowering the high liquefaction state. The reaction by-products mean any kind of by-product or by-products from chemical reaction for production process. To hasten the pile up process, coolant is infused from the interior of the pile up passage. To further enhance the role of the coolant, supplied from the lower section of the by-product section is released into the cooling plate from the side. Through this, the reliability and quality of the product is greatly increased.

What is claimed is:

1. A method of processing a semiconductor wafer, the method comprising:
    setting the semiconductor wafer in a process chamber which is connected to a vacuum pump via a by-product pile-up section having a housing body;
    heating a liquefaction reduction section located in front of the by-product pile-up section;
    positioning a plurality of cooling plate panels within the by-product pile-up section, wherein the plurality of cooling plate panels are substantially parallel to each other and wherein each cooling plate panel includes:
        at least one through-opening; and
        at least one coolant path therein;
    aligning the coolant path within each cooling plate panel to a coolant supply path of the housing body of the by-product pile-up section;
    supplying coolant to all cooling plate panels;
    supplying reaction gases into the process chamber;
    processing a material on the semiconductor wafer by the reaction gases in the process chamber, wherein the processing produces reaction by-products;
    heating the reaction by-products in the liquefaction reduction section to reduce liquefaction of the reaction by-products;
    cooling the heated reaction by-products by the plurality of cooling plate panels, wherein the heat reaction by-products pass through the through-openings of the plurality of cooling plate panels; and
    removing any remaining by-products through the vacuum pump.

2. The method according to claim 1, further comprising receiving the heated reaction by-products from an upper portion of the by-product pile-up section, wherein the step of cooling includes receiving inflow coolant for the by-product pile-up section from the side.

3. The method according to claim 1, wherein one or more of silane ($SiH_4$) and Nitrous Oxide ($N_2O$) are used in the semiconductor processing or flat panel display processing device.

4. The method according to claim 1, wherein the temperature of the liquefaction reduction section ranges from 50 to 650 degrees Centigrade.

5. The method according to claim 1, prior to the step of heating the reaction by-products, further comprising performing a chemical vapor deposition (CVD) in the semiconductor processing or flat panel display processing device.

6. The method according to claim 1, wherein:
    the coolant is received through the lower section of the by-product pile up section, provided to the cooling plates through lateral walls of the by-product pile up section, and thereafter is discharged through the lateral walls.

7. The method according to claim 1, prior to the step of heating the reaction by-products, further comprising performing a thin film deposition on a substrate in the semiconductor processing or flat panel display processing device.

8. The method according to claim 1, prior to the step of heating the reaction by-products, further comprising etching a thin film disposed on a substrate in the semiconductor processing or flat panel display processing device.

9. A method of forming a compound film of Hafnium oxide (HfO) on a semiconductor wafer, the method comprising:
    setting the semiconductor wafer in a process chamber which is connected to a vacuum pump via a by-product pile-up section having a housing body;
    heating a liquefaction reduction section located in front of the by-product pile-up section;
    positioning a plurality of cooling plate panels within the by-product pile-up section, wherein the plurality of cooling plates are substantially parallel to each other and wherein each cooling plate panel includes:
        at least one through-opening; and
        at least one coolant path therein;
    aligning the coolant path within each cooling plate panel to a coolant supply path of the housing body of the by-product pile-up section;
    supplying coolant to all cooling plate panels;
    injecting precursor of Hafnium and oxygen into the process chamber;
    forming a compound of Hafnium oxide (HfO) on the semiconductor wafer in the process chamber, wherein the forming produces reaction by-products;
    heating the reaction by-products in the liquefaction reduction section to reduce liquefaction of the reaction by-products;
    cooling the heated reaction by-products by the plurality of cooling plate panels, wherein the heat reaction by-products pass through the through-openings of the plurality of cooling plate panels; and
    removing any remaining by-products through the vacuum pump.

10. The method according to claim 9, further comprising receiving the heated reaction by-products from an upper portion of a by-product pile-up section, wherein the step of cooling a plurality of cooling plates includes receiving inflow coolant for the cooling plates from the side.

11. The method according to claim 9, wherein one or more of silane ($SiH_4$) and Nitrous Oxide ($N_2O$) are used in the semiconductor processing or flat panel display processing device.

12. The method according to claim 9, wherein the temperature of the liquefaction reduction section ranges from 50 to 650 degrees Centigrade.

13. The method according to claim 9, prior to the step of heating the reaction by-products, further comprising performing a chemical vapor deposition (CVD) in the semiconductor processing or flat panel display processing device.

14. The method according to claim 9, wherein:
the coolant is received through a lower section of a by-product pile up section, provided to the cooling plates through lateral walls of the by-product pile up section, and thereafter is discharged through the lateral walls.

15. The method according to claim 9, prior to the step of heating the reaction by-products, further comprising performing a thin film deposition on a substrate in the semiconductor processing or flat panel display processing device.

16. The method according to claim 9, prior to the step of heating the reaction by-products, further comprising etching a thin film disposed on a substrate in the semiconductor processing or flat panel display processing device.

* * * * *